(12) United States Patent
Meyer et al.

(10) Patent No.: US 9,989,403 B2
(45) Date of Patent: Jun. 5, 2018

(54) WEIGHING DEVICE PROVIDING CONTACTLESS POWER TO AT LEAST ONE SECONDARY UNIT

(71) Applicant: Mettler-Toledo GmbH, Greifensee (CH)

(72) Inventors: Michael Meyer, Nänikon (CH); Guido Schuster, Stäfa (CH); Christoph Beeler, Uznach (CH)

(73) Assignee: METTLER-TOLEDO GMBH, Greifensee (CH)

( * ) Notice: Subject to any disclaimer, the term of this patent is extended or adjusted under 35 U.S.C. 154(b) by 181 days.

(21) Appl. No.: 15/136,249

(22) Filed: Apr. 22, 2016

(65) Prior Publication Data
US 2016/0334268 A1 Nov. 17, 2016

(30) Foreign Application Priority Data

May 11, 2015 (EP) .................................... 15167066

(51) Int. Cl.
| | |
|---|---|
| *G01G 17/02* | (2006.01) |
| *G01G 21/28* | (2006.01) |
| *G01G 23/00* | (2006.01) |
| *H01F 38/14* | (2006.01) |
| *H02J 50/10* | (2016.01) |
| *H02J 50/80* | (2016.01) |
| *G01G 21/22* | (2006.01) |
| *G01G 17/06* | (2006.01) |

(52) U.S. Cl.
CPC ........... *G01G 23/007* (2013.01); *G01G 21/22* (2013.01); *G01G 21/28* (2013.01); *G01G 23/00* (2013.01); *H01F 38/14* (2013.01); *H02J 50/10* (2016.02); *H02J 50/80* (2016.02); *G01G 17/06* (2013.01)

(58) Field of Classification Search
CPC .... G01G 21/28; G01G 19/4144; G01G 23/38; G01G 23/48; G01G 23/3728; G01G 17/06; G01G 23/007; G01G 21/22; G01G 23/00; H02J 50/80; H02J 50/10; H01F 38/14
See application file for complete search history.

(56) References Cited

U.S. PATENT DOCUMENTS

| | | | | |
|---|---|---|---|---|
| 4,458,539 | A * | 7/1984 | Bilstad ................ | A61M 1/3496 177/211 |
| 5,042,834 | A * | 8/1991 | Yonekawa ........... | B60G 17/016 280/5.508 |
| 5,261,742 | A | 11/1993 | Lockhart | |

(Continued)

*Primary Examiner* — Randy Gibson
(74) *Attorney, Agent, or Firm* — Standley Law Group LLP

(57) ABSTRACT

A weighing device (101) has a weighing unit (102), a control unit and at least one application unit (110). The application unit is positioned within a secondary unit (104) that also has a receiving unit. The control unit has a unit for transmitting data. The weighing unit comprises load receivers (106) and a power transmitting unit. The secondary unit is placed on the load receivers, leaving a gap between the top side of the weighing unit and the bottom side of the secondary unit. The weighing unit transmits a power signal from the power transmitting unit to the receiving unit of the secondary unit through the gap and a control signal is transmitted from the data transmitting unit to the receiving unit of the secondary unit through the gap. The secondary unit, and in turn the application unit, is powered and controlled in a contactless manner.

16 Claims, 3 Drawing Sheets

(56) References Cited

U.S. PATENT DOCUMENTS

| | | | |
|---|---|---|---|
| 6,321,798 B1* | 11/2001 | Solignac | B01F 15/0234 |
| | | | 141/192 |
| 6,972,384 B2* | 12/2005 | Huitt | G01G 23/00 |
| | | | 177/25.13 |
| 7,053,316 B2* | 5/2006 | Murdter | G01G 19/4144 |
| | | | 177/25.13 |
| 8,430,135 B2 | 4/2013 | Waters | |
| 9,091,587 B2* | 7/2015 | Kawamura | G01G 19/4144 |
| 9,247,850 B2 | 2/2016 | Alet Vidal et al. | |
| 2008/0257446 A1* | 10/2008 | Oakes | B01F 13/1055 |
| | | | 141/1 |
| 2010/0051648 A1* | 3/2010 | Luchinger | B65B 1/12 |
| | | | 222/227 |
| 2010/0299074 A1* | 11/2010 | Chang | A01K 5/00 |
| | | | 702/19 |
| 2012/0217069 A1* | 8/2012 | Kawamura | G01G 19/4144 |
| | | | 177/25.13 |
| 2013/0019988 A1* | 1/2013 | Jalenques | G01G 17/06 |
| | | | 141/1 |
| 2014/0311329 A1* | 10/2014 | Dyke | F41H 5/0435 |
| | | | 89/36.02 |
| 2015/0242660 A1* | 8/2015 | Baarman | G01G 19/4144 |
| | | | 235/383 |

* cited by examiner

WEIGHING DEVICE PROVIDING CONTACTLESS POWER TO AT LEAST ONE SECONDARY UNIT

CROSS-REFERENCE TO RELATED APPLICATIONS

This application is entitled to benefit of a right of priority from European Patent Application No. 15167066.8, filed on 11 May 2015. The content of that application is incorporated by reference as if fully recited herein.

TECHNICAL FIELD

The invention concerns a weighing device which is used in laboratories.

BACKGROUND

Weighing devices are commonly used in laboratories to determine the weight or weight change of a sample. Furthermore, in laboratories, there is usually a need to carry out plural operations on the same sample. For example, there might be a need to weigh a sample and additionally also to magnetically stir or dispense or any such operation on the sample. Instead of using multiple devices for carrying out these different operations on the same sample, a single device can be used.

Depending on the use of the weighing device as a laboratory device to be operated by a laboratory expert, and depending on the particular circumstances at the given laboratory, it may be desired that the different application units be placed where they are most favourably situated for the user. However, on the one hand, this conflicts with the fact that, to operate the weighing device, the flow of data and power between the application units of the weighing device must be maintained. On the other hand, the installation of power or data lines for the transmission of signals is expensive and space consuming.

One such device is discussed in U.S. Pat. No. 5,261,742 A wherein the weighing device carries out an additional operation of magnetically stirring the sample material apart from weighing the same. The weighing balance and the magnetic stirrer are powered separately in this document. The magnetic stirrer is removable attached to the weighing balance and has a separate air driven powering mechanism connected to it. A disadvantage of the device discussed in the above US publication is that it requires complex wiring for powering the magnetic stirrer increasing the space required as well as the cost for the installation. Another disadvantage of such a device is that it uses two separate power sources to power both the weighing balance and the magnetic stirrer thus increasing power consumption.

Another such device with an additional application other than weighing is discussed in document U.S. Pat. No. 8,430,135 B2 wherein a measured dispensing apparatus is presented. The dispensing apparatus dispenses material whilst weighing the dispensed sample material. A disadvantage of this device is the need for an additional external control unit requiring additional space and complex wiring to connect to the other units making the device bulky and expensive.

It is an object of the present invention to provide a weighing device that is easy to use, compact, power efficient and cost effective.

It is further an objective of the invention to provide a weighing device that is capable of carrying out additional operations over just weighing the sample material.

SUMMARY

With the above objectives in view, the present invention discusses a weighing device according to the independent claims.

According to the present invention in one aspect, there is provided a weighing device comprising a weighing unit, a control unit and at least one application unit. Such an application unit is comprised within a secondary unit; this secondary unit also comprises a receiving unit. The control unit comprises a data transmitting unit. The weighing unit comprises load receivers and a power transmitting unit. The secondary unit is placed on the load receivers of the weighing unit leaving a gap between the top side of the weighing unit and the bottom side of the secondary unit. The weighing unit transmits a power signal from the power transmitting unit to the receiving unit of the secondary unit through the gap and a control signal is transmitted from the data transmitting unit to the receiving unit of the secondary unit through the gap. The secondary unit and in turn the application unit is thus powered and controlled contactless by the weighing unit and the control unit respectively.

An advantageous feature of the present invention is that due to the contactless powering and controlling of the application unit by the weighing unit and control unit respectively, the weighing device becomes compact and non-bulky due to absence of cables or cords for power and data transfer.

According to the present invention, the power transmitting unit comprises at least one sending coil. This sending coil is placed towards a top side of the weighing unit facing a bottom side of the secondary unit.

The power transmitting unit is used for transmitting the power signal from the weighing unit towards the secondary unit using the sending coil.

The advantage of the placement of the sending coil towards the top side of the weighing unit is to assist in the process of contactless power transfer.

According to the present invention, there is further provided a power receiving unit within the receiving unit. This power receiving unit comprises a receiving coil that is placed towards the bottom side of the secondary unit.

The power receiving unit is used for receiving the power signal through the receiving coil transmitted from the sending coil of the power transmitting unit of the weighing unit. Together, the power receiving unit and the power transmitting unit thus assist in the contactless power transfer between the weighing unit and the application unit.

The advantage of the placement of the receiving coil towards the bottom side of the secondary unit is to assist in the process contactless power transfer between the two coils. The top side of weighing unit and the bottom side of the secondary unit carrying the sending coil and the receiving coil respectively face each other when the secondary unit is placed on the load receivers, and in turn make the two coils face each other so that the sending coil when connected to a standard power source transmits power by electromagnetic fields across a gap to the receiving coil, where it is converted back to electric power and utilized.

The sending coil and the receiving coil thus help transfer power from the weighing unit to the application through induction coupling. The sending coil when energized by a standard power source connected to the weighing unit induces power into the receiving coil which in turn powers the application unit.

The sending coil and receiving coil are oriented horizontally with respect to the top side of the weighing unit and said bottom side of said secondary unit respectively according to one aspect of the present invention.

The advantage of a horizontal orientation of the sending coil and the receiving coil is to make the weighing device non-bulky by consuming less space. The placement of the coils will be between the secondary unit and the weighing unit thus saving extra space making the weighing device compact, handy and easy to use.

The sending coil and receiving coil are oriented vertically with respect to said top side of said weighing unit and said bottom side of said secondary unit respectively according to another aspect of the present invention.

The vertical orientation of the sending and receiving coil is advantageous from the perspective that the induction force produced between the sending and receiving coil should not be in the direction of weighing as it may affect the weighing accuracy. For the same reason, the coils can be oriented vertically and placed behind the weighing unit so that the induction force does not come in the way of the weighing operation.

According to the present invention in one aspect, the width of the gap created between the sending coil and the receiving coil as a result of placing the secondary unit on the load receivers of the weighing unit ranges from 5 mm to a maximum of 100 mm.

The width of the gap ranges from 5 mm up to a maximum of 100 mm according to the present invention, the exact width of the gap depends on the type of application unit. For example, the width of the gap for applications like a magnetic stirrer is generally fixed and mechanically designed to be 5 mm. A short gap of 5 mm is particularly useful because a short gap ensures good power transmission efficiency. Also, in laboratory applications, a short gap ensures a compact device. Another example would be a dosing pump as an application unit. The widths of the gap for a dosing pump is not fixed or mechanically designed like in the magnetic stirrer and can range up to a maximum of 100 mm. The reason for a flexible width of the gap (>=100 mm) is that the positioning tolerance should not be too restricted to provide good usability for the user when a bottle with sample is placed on the weighing unit.

In the present invention, the power transfer from the weighing unit to the secondary unit and in turn the application unit and/or the data transfer from the control unit to the secondary unit and in turn the application unit is cableless or cord-less.

The advantage of a cable-less or cord-less power and/or data transfer according to the present invention is that the weighing device becomes compact, easy to use as well as easy to clean.

The application unit is free of an external user control means and hence can be accessed from the control unit itself which also controls the weighing unit thus improving user accessibility and ease of use according to the present invention.

An advantage of having an application unit which is free of external user control means according to the present invention is that there are less features on the geometry of the application unit making it user friendly and also cleaning the same gets easier reducing the risk of cross contamination.

The weighing device according to the present invention comprises a single standard power source that is used to power both the weighing unit and the secondary unit.

An advantageous feature of the present invention is that due to the usage of a single power source to power the weighing unit as well as the application unit, the weighing device is power efficient and cost effective.

The weighing device has a single control unit to control both the weighing unit and the secondary unit according to the present invention.

A single control unit to control both the application unit and the weighing unit is advantageous according to the present invention, as it avoids the need for multiple control units is avoided making the device compact, cost effective and user friendly.

The secondary unit of the weighing device comprises a back-up battery to additionally power the secondary unit.

The secondary unit receives power transmitted contactless from the power transmitting unit as discussed above but sometimes more power is required by the secondary unit than is transmitted by the power transmitting unit. To ensure that the secondary unit receives enough power required to operate the application unit(s), an additional back-up battery is placed within the secondary unit.

An advantage of the back-up battery in the secondary unit is that in case the secondary unit is removed from the weighing unit while or post an operation, the left over charge in the back-up battery of the secondary unit is capable of supplying power to the secondary unit required to operate the application unit till the back-up battery lasts.

A further advantage of the back-up battery is that it makes the weighing device more reliable as well as less prone to errors as the secondary unit can receive power from two sources in case one power source should temporarily fail.

The application unit of the weighing device according to the present invention can be any one of but not limited to a magnetic stirrer or a dispensing unit or a dosing unit.

A method of contactless powering the application unit by the weighing unit according the present invention, wherein the method comprises transmission of power through inductive coupling of the sending coil and the receiving coil, once the sending coil is energized by a standard power source that is connected to the weighing unit.

An advantage of the present method of contactless powering the application unit by the weighing unit is to make the device user friendly, cost effective and power efficient.

A further advantage of the present method of contactless powering the application unit by weighing unit is to avoid the need for cables to transfer power between the application unit and the weighing unit making the device compact and cost effective.

A method of contactless controlling the application unit by the control unit according the present invention, wherein the method comprises transmitting the control signal from the data transmitting unit to a data receiving unit comprised within the receiving unit via any one of the protocols such as but not limited to optocoupling, photocoupling, RFID transfer, infrared transfer or Bluetooth transfer.

The data receiving unit comprised within the receiving unit is used for receiving the control signal or data signal transmitted from the data transmitting unit of the control unit. The data receiving unit and the data transmitting unit thus assist in the contactless data or control signal transfer between the weighing unit and the application unit.

An advantage of the present method of contactless controlling the application unit by weighing unit is to avoid the need for cables to transfer data or control signal between the application unit and the weighing unit making the device compact and cost effective.

An advantage of the present method of using protocols like Bluetooth, infrared, RFID, optocoupling or photocoupling is that the application unit can be contactless controlled by the terminal connected to the weighing unit which helps to avoid the need for cables to transfer data or control signal between the application unit and the weighing unit making the device compact and cost effective.

In another advantageous embodiment of the present invention, the power and control signals are transmitted to the receiving unit separately in time.

The advantage of transmitting the power and control signal separately according to one aspect of the present invention is that this method makes the weighing device energy efficient and cost effective.

A further advantageous embodiment of the present invention is that the power signal and the control signal are transmitted to the receiving unit at the same time by superimposing both the signals.

The advantage of transmitting the power and control signal simultaneously according to another aspect of the present invention is that this method makes the weighing device time efficient.

BRIEF DESCRIPTION OF THE DRAWINGS

Details of weighing device according to the invention are explained in the description of the examples that are illustrated in the drawings, wherein.

DETAILED DESCRIPTION

Figure 1:
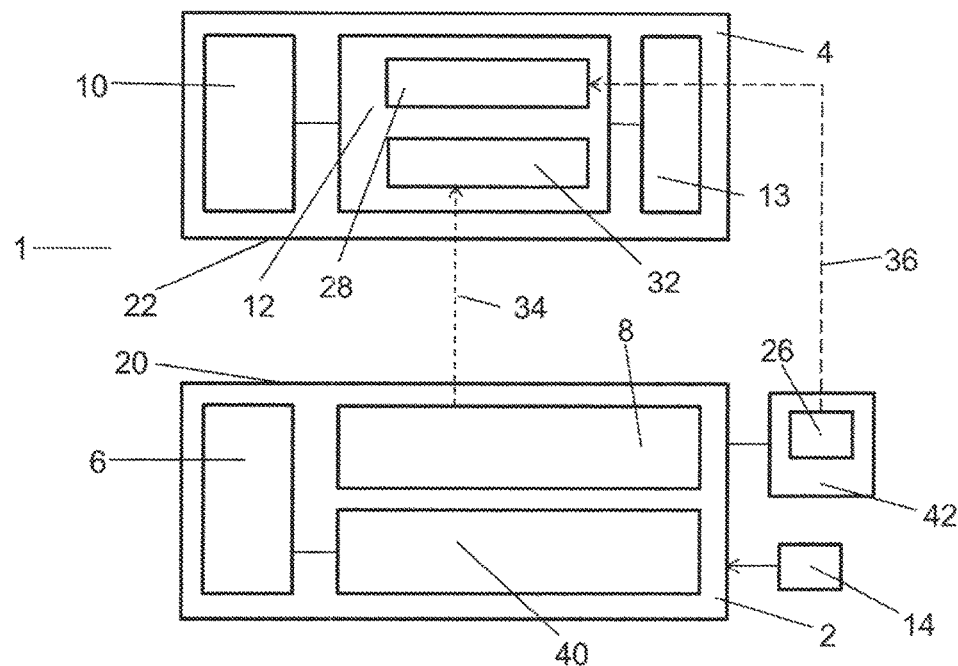
FIG. 1 is a block diagram of the weighing device according to the present invention.

FIG. 1 shows a block diagram of the weighing device 1 according to the present invention. As seen in the block diagram, the weighing device 1 comprises a weighing unit 2, a control unit 42 and a secondary unit 4.

The weighing unit 2 as shown in FIG. 1 comprises a load cell 40, a load receiver 6 and a power transmitting unit 8. When an object to be weighed (not shown in figure) is placed on the weighing unit 2, the force exerted by the object is transmitted by the load receiver 6 to the load cell 40 wherein the force is converted to an equivalent electrical signal to give out the weight of the object. The power transmitting unit 8 is used for transmission of power to the secondary unit 4. The weighing unit 2 is powered by a standard power source 14 as seen in FIG. 1. The control unit 42 is connected to the weighing unit 2. The control unit 42 comprises a data transmitting unit 26 that is used for transmission of data to the secondary unit 4. The control unit 42 as shown in FIG. 1 is connected externally to the weighing unit 2. The control unit 42 however, can be placed within the weighing unit 2 as well.

The secondary unit 4 as shown in FIG. 1 comprises of at least one application unit 10, a receiving unit 12 and a back-up battery 13. An application unit 10 can be any one of a magnetic stirrer, a dispenser or a dosing unit to name a few examples. The receiving unit 12 further comprises a power receiving unit 32 and a data receiving unit 28. These two separate receiving units are used for reception of power and data from the secondary unit 4 respectively. A power signal 34 as seen in FIG. 1 can be contactless transmitted from the power transmitting unit 8 to the power receiving unit 32. Further, a control signal 36 can also be contactless transmitted from the data transmitting unit 26 to the data receiving unit 28 as seen in FIG. 1. A back-up battery 13 is comprised within the secondary unit 4 as seen in FIG. 1 to ensure sufficient power is supplied to the secondary unit 4 required to operate the application unit 10 in case sufficient power is not received by contactless power transmission.

Figure 2:
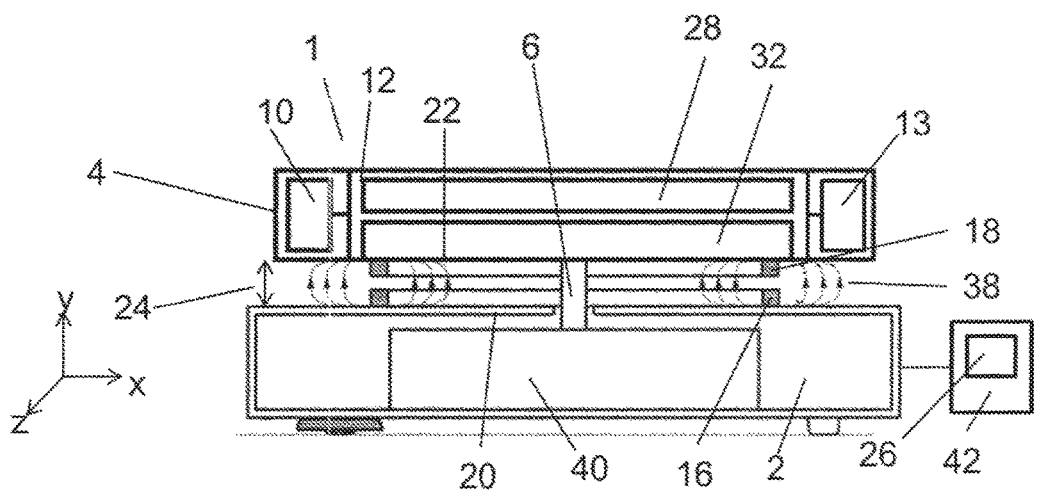
FIG. 2 shows a side view of the weighing device cut orthogonal to the z axis, wherein a power signal is inductively coupled between the weighing unit and the secondary unit according to the present invention.

FIG. 2 shows a side view of the weighing device 1 cut orthogonal to the z axis wherein a power signal 34 is inductively coupled between the weighing unit 2 and the secondary unit 4 according to the present invention. As seen in FIG. 2, the power transmitting unit 8 comprises at least one sending coil 16 and the power receiving unit 32 comprises at least one receiving coil 18. The power transmitting unit 8 and hence the sending coil 16 is placed towards the top side 20 of the weighing unit 2 and the power receiving unit 32 and hence the receiving coil 18 is placed towards the bottom side 22 of the secondary unit 4 in such a way that the sides having the two respective coils face each other once the secondary unit 4 is placed on the load receiver 6 of the weighing unit 2. When the secondary unit 4 is placed onto the load receiver 6 of the weighing unit 2, a gap 24 is created between the sending coil 16 and the receiving coil 18 as seen in the FIG. 2. The top side 20 of weighing unit 2 and the bottom side 22 of the secondary unit 4 carrying the sending coil 16 and the receiving coil 18 respectively face each other like mentioned before, and in turn make the two coils face each other so that the sending coil 16 when connected to a standard power source 14 (shown in FIG. 1) transmits a power signal 34 by electromagnetic fields across the gap 24 to the receiving coil 18, where it is converted back to electric power and utilized. The control unit 42 is connected to the weighing unit 2. The control unit 42 comprises a data transmitting unit 26 that is used for transmission of data to the secondary unit 4. The control unit 42 as shown in FIG. 2 is connected externally to the weighing unit 2. The control unit 42 however, can be placed within the weighing unit 2 as well. A back-up battery 13 is comprised within the secondary unit 4 as seen in FIG. 2 to ensure sufficient power is supplied to the secondary unit 4 required to operate the application unit 10 in case sufficient power is not received by contactless power transmission.

The width of the gap 24 that is created between the sending coil 16 and the receiving coil 18 once the secondary unit 4 is placed on the load receiver 6 of the weighing unit 2 ranges from 5 mm to a maximum of 100 mm in the present invention depending on the type of the application unit 10. For example, for an application like magnetic stirrer, the width of the gap 24 is fixed to about 5 mm but for applications like dosing units, the width of the gap 24 can go up to a maximum of 100 mm.

Figure 3:
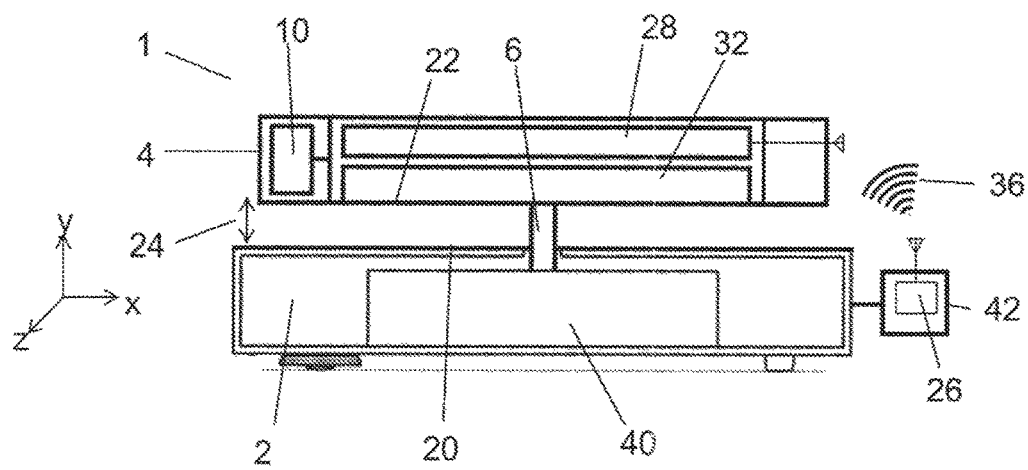
FIG. 3 shows a side view of the weighing device cut orthogonal to the z axis, wherein a control signal is transmitted contactless from the control unit to the secondary unit according to the present invention.

FIG. 3 shows a side view of the weighing device 1 cut orthogonal to the z axis, wherein a control signal 36 is transmitted contactless from the control unit 42 to the secondary unit 4 according to the present invention. As seen in FIG. 3, the control unit 42 comprises the data transmitting unit 26. When there is a need to control the application unit 10, or if a communication is required with the secondary unit 4, the control unit 42 sends a control signal 36 or an equivalent data signal to the data transmitting unit 26, which then transmits this control signal 36 to the data receiving unit 28 contactless as seen in FIG. 3. The data transmitting unit 26 can be any among but not limited to a Bluetooth transmitter, infrared transmitter, RFID transmitter or a light source. The data receiving unit 28 can be any among but not limited to a Bluetooth receiver, infrared receiver, RFID receiver or a photosensor. The application unit 10 is thus free of an external user control means and hence can be accessed and controlled from the control unit 42.

From FIG. 2 and FIG. 3, it is evident that the power and data transfer from the weighing unit 2 to the secondary unit 4 or the application unit 10 is cable-less or cord-less as power and data is contactless transmitted from the power transmitting unit 8 and the data transmitting unit 26 to the receiving unit 12 of the secondary unit 4 respectively.

In a preferred embodiment of the present invention, the control signal 36 and the power signal 34 can be sent simultaneously by superimposing the two signals, making the device time efficient.

In another preferred embodiment of the present invention, the control signal 36 and the power signal 34 can be sent separately, making the device energy efficient.

Figure 4:
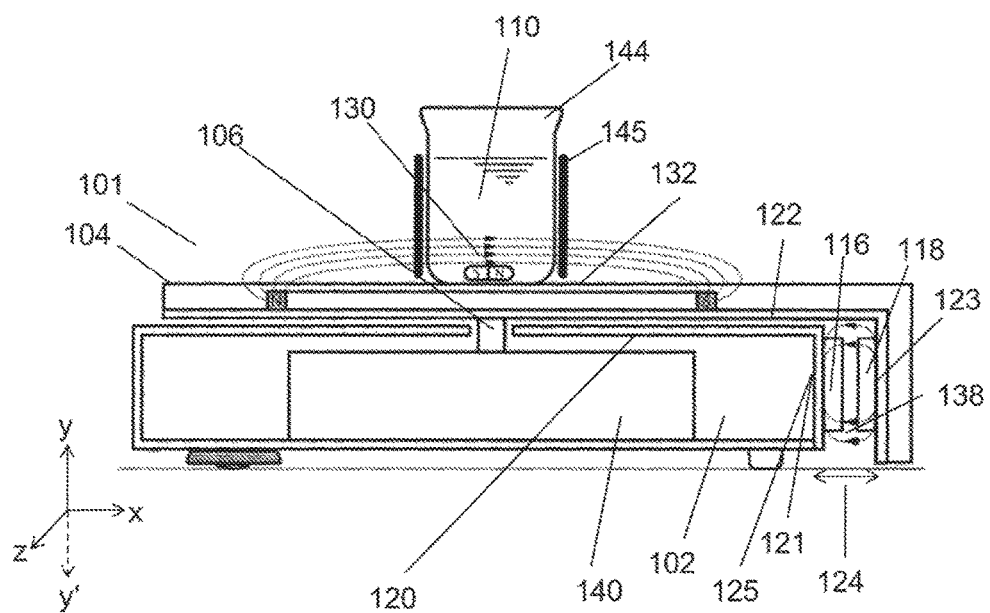
FIG. 4 shows a side view of the weighing device cut orthogonal to the z axis, wherein the application unit is a magnetic stirrer with a vertical orientation of the sending coil and receiving coil with respect to the top side of the weighing unit and the bottom side of the secondary unit respectively according to another embodiment of the present invention.

FIG. 4 shows a side view of the weighing device 101 cut orthogonal to the z axis, wherein the application unit 110 is a magnetic stirrer 130 with a vertical orientation of the sending coil 116 and receiving coil 118 with respect to the top side 120 of the weighing unit 102 and the bottom side 122 of the secondary unit 104 according to another embodiment of the present invention. In FIG. 4, the top side 120 of the weighing unit 102 is orthogonally extended to form an orthogonal top side 121 as well as the bottom side 122 of the secondary unit 104 is orthogonally extended to form an orthogonal bottom side 123. The sending coil 116 is thus placed towards the orthogonal top side 121 of the weighing unit 102 and the receiving coil 118 is placed towards the orthogonal bottom side 123 of the secondary unit 104 thus making the orientation of the two coils vertical (along y-y' axis). The two coils can thus be placed on the back side 125 of the weighing unit 102 which is also the orthogonal top side 121 of the weighing unit 102 as seen in FIG. 4 to make sure the inductive force is not in the weighing direction. When the secondary unit 104 is placed on the load receiver 106 of the weighing unit 102, power is inductively coupled from the sending coil 116 to the receiving coil 118 through the gap 124. This induced power then powers the magnetic stirrer 130 and the heating coil 145 that stirs and heats the sample in the beaker 144 respectively. The width of the gap 124 for applications like a magnetic stirrer 130 is fixed and mechanically designed to 5 mm.

Figure 5:
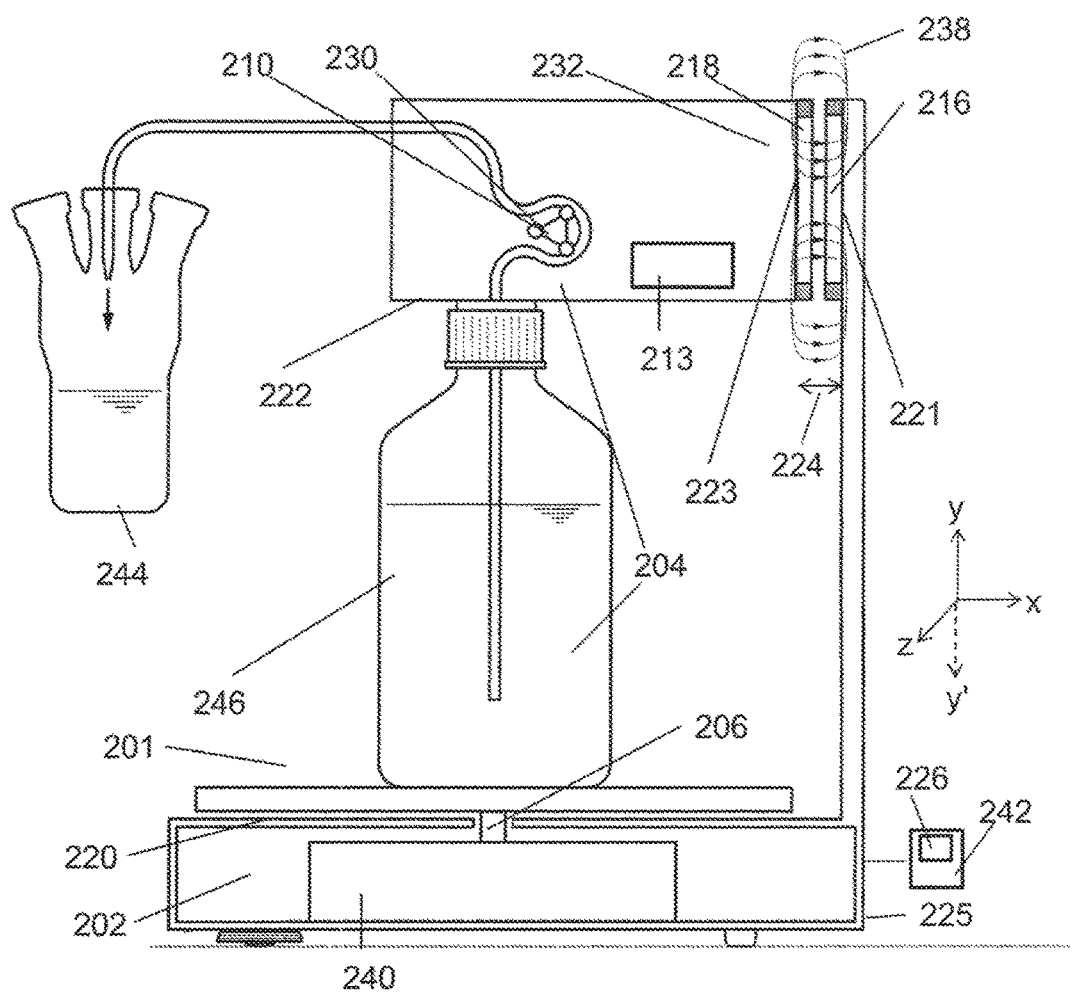
FIG. 5 shows a side view of the weighing device cut orthogonal to the z axis, wherein the application unit is a dosing unit and the orientation of the sending coil and receiving coil is orthogonal with respect to the top side of the weighing unit and the bottom side of the secondary unit respectively according to a yet another embodiment of the present invention.

FIG. 5 shows a side view of the weighing device 201 cut orthogonal to the z axis, wherein the application unit 210 is a dosing pump 230 with a vertical orientation of the sending coil 216 and receiving coil 218 with respect to the top side 220 of the weighing unit 202 and the bottom side 222 of the secondary unit 204 respectively according to yet another embodiment of the present invention. In FIG. 5, the top side 220 of the weighing unit 202 is orthogonally extended to form an orthogonal top side 221 as well as the bottom side 222 of the secondary unit 204 is orthogonally extended to form an orthogonal bottom side 223. The sending coil 216 is thus placed towards the orthogonal top side 221 of the weighing unit 202 and the receiving coil 218 is placed towards the orthogonal bottom side 223 of the secondary unit 204 thus making the orientation of the two coils vertical (along y-y' axis). The two coils can thus be placed at the back side 225 of the weighing unit 201 as seen in FIG. 4 to make sure the inductive force is not in the weighing direction. When the container 246 attached to the pump 230 and the reactor 244 is placed on the load receiver 206 of the weighing unit 202, power is inductively coupled from the sending coil 216 to the receiving coil 218 through the gap 224. This induced power then powers the pump 230 that controllably dispenses the sample from the container 246 to the reactor 244. The width of the gap 224 for applications like a dispensing pump 230 is not fixed and can range up to a maximum of 100 mm. The control unit 242 is connected to the weighing unit 202. The control unit 242 comprises a data transmitting unit 226 that is used for transmission of data to the secondary unit 204. The control unit 242 as shown in FIG. 5 is connected externally to the weighing unit 202. The control unit 242 however, can be placed within the weighing unit 202 as well. A back up-battery 213 is comprised within the secondary unit 204 to ensure sufficient power is supplied to the secondary unit 204 required to operate the application unit 210 in case sufficient power is not received by contactless power transmission.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A device for weighing an object, comprising:
   a weighing unit, comprising a load receiver and a power transmitting unit,
   a control unit, comprising a data transmitting unit; and
   at least one secondary unit that comprises an application unit and a receiving unit, such that, in an operative condition with the secondary unit placed on the load receiver, a power signal originating in the power transmitting unit to the receiving unit provides power to the application unit and a control signal originating in the data transmitting unit provides control instructions to the application unit, both signals being transmitted in a contactless manner, wherein the application unit is selected from one of the following: a magnetic stirrer; a dispensing unit; and a dosing unit.

2. The device of claim 1, wherein:
   the power transmitting unit comprises at least one sending coil that is placed towards a top side of the weighing unit, facing a bottom side of the secondary unit.

3. The device of claim 2, wherein:
   the receiving unit comprises a power receiving unit that has at least one receiving coil, placed towards the bottom side of the secondary unit.

4. The device of claim 3, wherein:
at least one said sending coil and at least one said receiving coil are oriented horizontally with respect to the top side of the weighing unit and the bottom side of the secondary unit, respectively.

5. The device of claim 3, wherein:
at least one said sending coil and at least one said receiving coil are oriented vertical with respect to the top side of the weighing unit and the bottom side of the secondary unit, respectively.

6. The device of claim 4, wherein:
the sending coil and the receiving coil are spaced apart by a gap in the range of 5 mm to 100 mm.

7. The device of claim 1, wherein:
the transmittal of the power signal from the weighing unit to the secondary unit and/or the transmittal of the data signal from the control unit to the secondary unit is cordless or cable-less.

8. The device of claim 1, wherein:
the secondary unit is controlled solely through the control unit.

9. The device of claim 1, wherein:
a single standard power source and a single said control unit is used to power and control both said weighing unit and said secondary unit respectively.

10. The device of claim 1, wherein:
the secondary unit further comprises a back-up battery, arranged to power the secondary unit.

11. A method of powering, in a contactless manner, a secondary unit associated with a weighing unit, comprising the steps of:
energizing a standard power source that is connected to the weighing unit; and
inducing magnetically, using a sending coil of the weighing unit, a power signal in a receiving coil of the secondary unit, wherein the secondary unit comprises an application unit selected from one of the following: a magnetic stirrer; a dispensing unit; and a dosing unit.

12. The method of claim 11, further comprising the step of:
transmitting, by means of a data transmitting unit of the control unit, a control signal to a data receiving unit of the secondary unit.

13. The method of claim 12, wherein:
the power signal and the control signal are transmitted separately.

14. The method of claim 12, wherein:
the power signal and the control signal are transmitted at the same time.

15. The device of claim 5, wherein:
the sending coil and the receiving coil are spaced apart by a gap in the range of 5 mm to 100 mm.

16. The method of claim 12, wherein:
the transmitting of the control signal is accomplished by a method selected from the group consisting of: opto-coupling, photocoupling, infrared transfer, Bluetooth transfer or RFID transfer.

* * * * *